(12) United States Patent  
Shapson et al.

(10) Patent No.: US 7,296,938 B1  
(45) Date of Patent: Nov. 20, 2007

(54) FIBER NODE WITH ACTIVE OPTICAL TO RF INTERFACE CONNECTOR

(75) Inventors: Jay F. Shapson, Englishtown, NJ (US); Robert L. Romerein, Pontypool (CA)

(73) Assignee: Extreme Broadband Engineering, LLC, Englishtown, NJ (US)

(*) Notice: Subject to any disclaimer, the term of this patent is extended or adjusted under 35 U.S.C. 154(b) by 0 days.

(21) Appl. No.: 11/440,936

(22) Filed: May 25, 2006

(51) Int. Cl.  
*G02B 6/36* (2006.01)  
*G02B 6/38* (2006.01)

(52) U.S. Cl. .......................... 385/92; 385/88; 385/94; 385/76; 385/77; 385/78; 385/81; 385/84

(58) Field of Classification Search ................... 385/92  
See application file for complete search history.

(56) References Cited

U.S. PATENT DOCUMENTS

| | | | | |
|---|---|---|---|---|
| 4,547,039 A | * | 10/1985 | Caron et al. ................... | 385/88 |
| 4,632,507 A | * | 12/1986 | Mignien et al. ............ | 385/135 |
| 4,744,626 A | * | 5/1988 | Mery ........................... | 385/90 |
| 5,515,469 A | * | 5/1996 | Zarem et al. ................. | 385/92 |
| 6,065,882 A | * | 5/2000 | Roller et al. .................. | 385/92 |
| 2003/0180012 A1 | * | 9/2003 | Deane et al. ................. | 385/92 |

OTHER PUBLICATIONS

AMP drawing No. 502585 (1 sheet).  
Zarlink Semiconductor's Drawing No. 101514 (1 sheet).

* cited by examiner

*Primary Examiner*—Frank G. Font  
*Assistant Examiner*—Ryan Lepisto  
(74) *Attorney, Agent, or Firm*—Watov & Kipnes, P.C.; Kenneth Watov

(57) ABSTRACT

An optical to RF interface connector has a cellular housing that has a back most portion configured for press fitting into a hole of the housing of an electro-optical apparatus, with the hole and back most portion of the shell being key to one another to insure proper orientation of the connector. The press fitting is further configured for providing both an RF seal, and moisture seal. The frontmost portion of the connector shell is configured for securely coupling to an optical interface male connector that is attached to an end of a fiber optic cable. The innermost portion of a connector shell is further configured for receiving and retaining therein either a auto detector or light detecting device for converting optical signals received from the fiber optic cable into electrical signals for processing, or is light transmitting device for converting electrical signals into optical signals for transmission over the associated fiber optic cable. A light mark is provided between within the connector shell between the light detecting transmitting device and a optical fiber terminating end of the male connector for permitting the passage of optical signals therebetween. The back most portion of the connecter shell is further configured for receiving the light detecting or transmitting device in an augmentation associated with the key position of the back most portion of press fit into the electro optical apparatus housing, for insuring that electrical leads of the light transmitting or light receiving device do not interfere with one another in being connected either to a printed circuit board or other termination within the housing of the associated apparatus.

26 Claims, 15 Drawing Sheets

FIBER NODE WITH ACTIVE OPTICAL TO RF INTERFACE CONNECTOR

FIELD OF THE INVENTION

The present invention relates generally to electrical and RF connectors, and more specifically relates to both connectors for use at an interface between the end of a fiber optic cable and a photodetector or a light transmitting device, or in the former converting light from the cable into an electrical signal, and for the latter converting an electrical signal into an optical signal for transmission over the fiber optic cable, and also relates to a fiber node including such connectors.

BACKGROUND OF THE INVENTION

Optical transmission of television and data signals has been rapidly expanded for use in television, and telecommunication systems. In cable television systems, fiber optic cable is now being employed in many systems from the point of transmission of television and data signals to the subscriber's premises. The use of coaxial cable for television and telecommunication systems is rapidly being replaced by the use of fiber optic cables because optical signals travel greater distances and require less repeater amplification than electrical signals transmitted via coaxial cable. Fiber optic signal distribution systems are also immune to electromagnetic interference either as ingress or egress.

As one example of usage of fiber optic cables in cable television systems, such cables consist of numerous single optical fibers, each capable of carrying a full spectrum of television and data information services. It is possible to allocate each fiber in a fiber optic cable at the subscriber end of a distribution system to an individual subscriber. Typically, a male connector is attached to the end of each fiber to enable the fibers to be connected to terminal equipment in a subscriber's home or business. The terminal equipment permits bi-directional communication between a subscriber and the cable television provider. In this example, the terminal equipment converts optical signals from the provider into electrical radio frequency signals for use by the subscriber, and also converts the electrical signals generated by the subscriber or the subscriber's equipment into optical signals for transmission over the optical cable to the provider.

Known terminal equipment typically employs an optical to RF interface connector configured for direct attachment to a printed circuit board within the housing of the terminal equipment. The fiber optic cable at the subscriber's end typically has a male connector attached to it, whereby the connector in a portion of the associated fiber optic cable must be passed through a hole in the housing of the terminal equipment, and plugged into the female optical to RF interface connector mounted on the printed circuit board. Interconnecting the terminal end of a fiber optic cable to a subscriber's terminal equipment is time consuming, and sometimes involves coiling of the fiber optic cable within the housing of the terminal equipment, that may attenuate the optical signal, or in a worse case may interrupt the signal, all of which increases the installation time to insure proper operation. The present inventors recognize that there is a need in the art for improved optical to RF interface connectors and connection systems.

SUMMARY OF THE INVENTION

One embodiment of the invention is an optical to RF interface connector that includes a housing or shell having a back portion configured for retaining a light detector device or light/laser transmitter device, and a front portion configured for receiving and securing to a terminating connector mounted on an end of a fiber optic cable, for permitting optical signals to pass between the fiber optic cable and the light detector or light/laser transmitter. The housing or shell is further configured for pressing a back portion into the housing of an associated electrical device. The electrical leads of the light detecting or light transmitting device protrude from the back portion of the shell in a manner facilitating connection of the leads to a printed circuit board located within the housing of the associated electrical device. In another embodiment of the invention, at least two of the inventive optical to RF interface connectors are press fit into the housing of a fiber node or optical to RF media conversion unit, whereby one of the connectors retains a light transmitter for optically transmitting broadband signals back to the optical cable system of a cable television provider, whereas the other connector retains a light detecting device for the reception of broadband signals from the fiber optic cable as transmitted from the cable system provider. In yet another embodiment of the invention, the fiber node or bi-directional RF/optical converter includes means for electrically operating the light transmitting device to convert electrical signals to optical signals for transmission through the fiber optic cable connected to the optical to RF interface output connector, and means for operating the light detecting device to convert optical signals from a fiber optic cable connected to the optical to RF interface input connector into electrical signals, whereby a diplex filter is used to bi-directionally couple electrical output and input signals between a bi-directional RF connector of the converter, and the means for operating the light transmitting device, and means for operating the light detecting or receiving device, respectively.

BRIEF DESCRIPTION OF THE DRAWINGS

Various embodiments of the present invention are described below with reference to the drawings, in which like items are identified by the same reference designation, wherein.

DETAILED DESCRIPTION OF THE INVENTION

Figure 1:
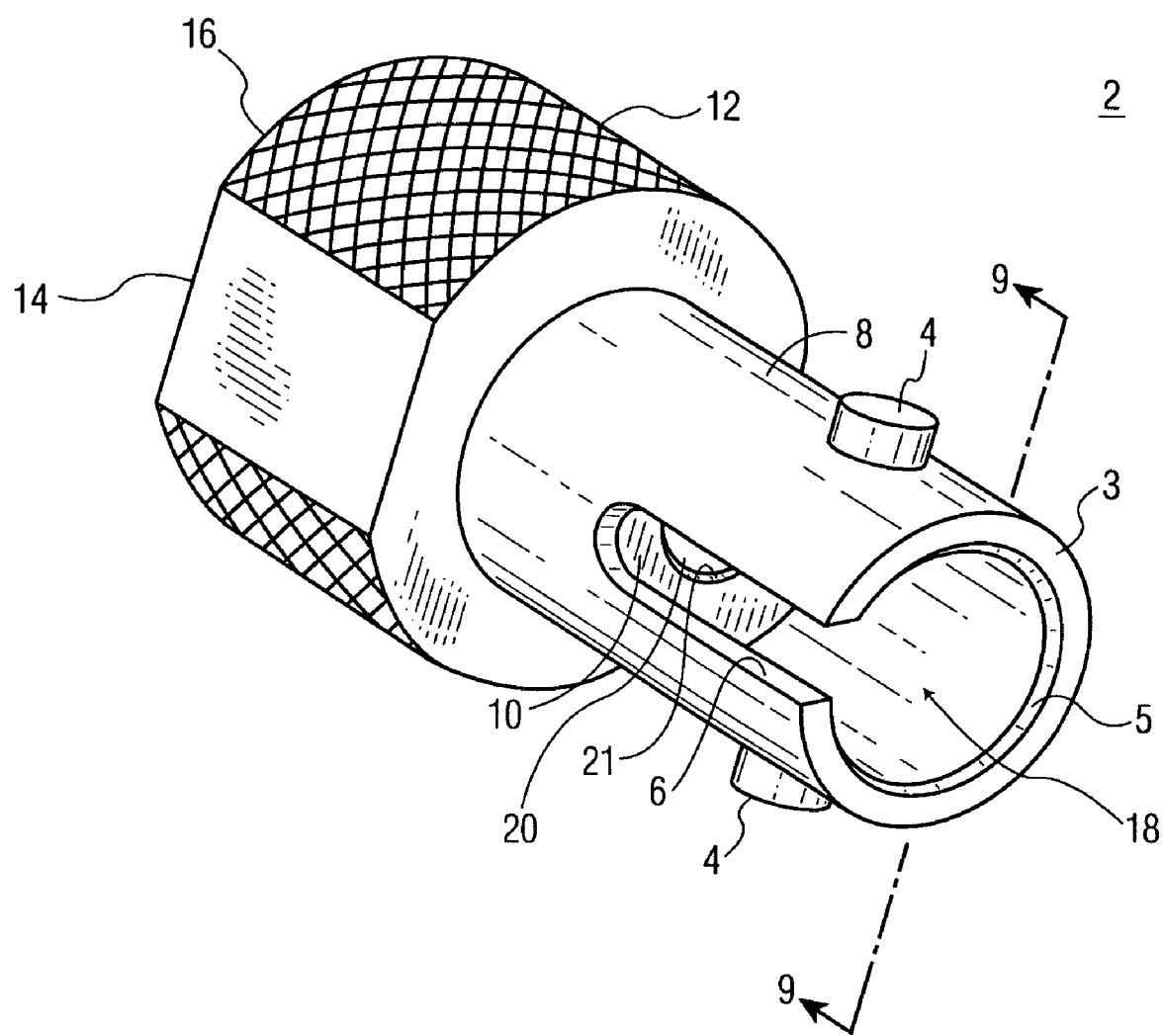
FIG. 1 is a pictorial view looking toward a front portion of an optical to RF interface connector for one embodiment of the invention.

With reference to FIG. 1, a pictorial view looking toward the front left side of the present connector 2 is shown for a first embodiment of the invention. In this embodiment, the female connector is configured for receiving an ST style male connector, the latter being a male fiber optic cable connector that is known in the art. The protrusions 4 and an open slot 6 provide for the bayonet interlocking configuration with the male ST connector at the end of a fiber optic cable (not shown). The protrusions 4 and open slot 6 are formed in a frontmost cylindrical segment 8, having a front face 3 with a beveled inside edge 5, and a hole 18, as shown. The inside diameter of hole 18 of the initial portion of the cylindrical segment 8 is dimensioned for snugly receiving the outermost portion of the male ST connector (not shown) to be received by the connector 2. As will be described in greater detail below, a ferrule located at the frontmost portion of the standard ST male optical fiber connector is received in hole 18 of connector 2. The hole 18 has a back face 10, that has a centrally located hole 20. The cylindrical segment 8 terminates to a back cylindrical segment 12 that includes a flat portion 14 for providing a D-configuration. In the preferred embodiment, segment 12, is knurled on its cylindrical portion, as shown. The back cylindrical segment 12 has a larger outside diameter than a frontmost cylindrical segment 8 of connector 2, as shown. The back circumferential edge 16 is beveled, with the back cylindrical segment 12 being otherwise configured for press fitting into a D-hole (not shown) of the housing of an electrical optical device. Use of the D-hole configuration, along with the flattened portion 14 of segment 12, insures that the connector 2 is properly oriented when press fit into the housing, to insure that the leads of an electrical optical device retained in the segment 12 are optimally aligned to facilitate connection of the leads from the device (not shown) to a printed circuit board or other electrical termination within the housing (not shown) of the electro-optical device (not shown). This configuration will be discussed in greater detail below.

Figure 2:
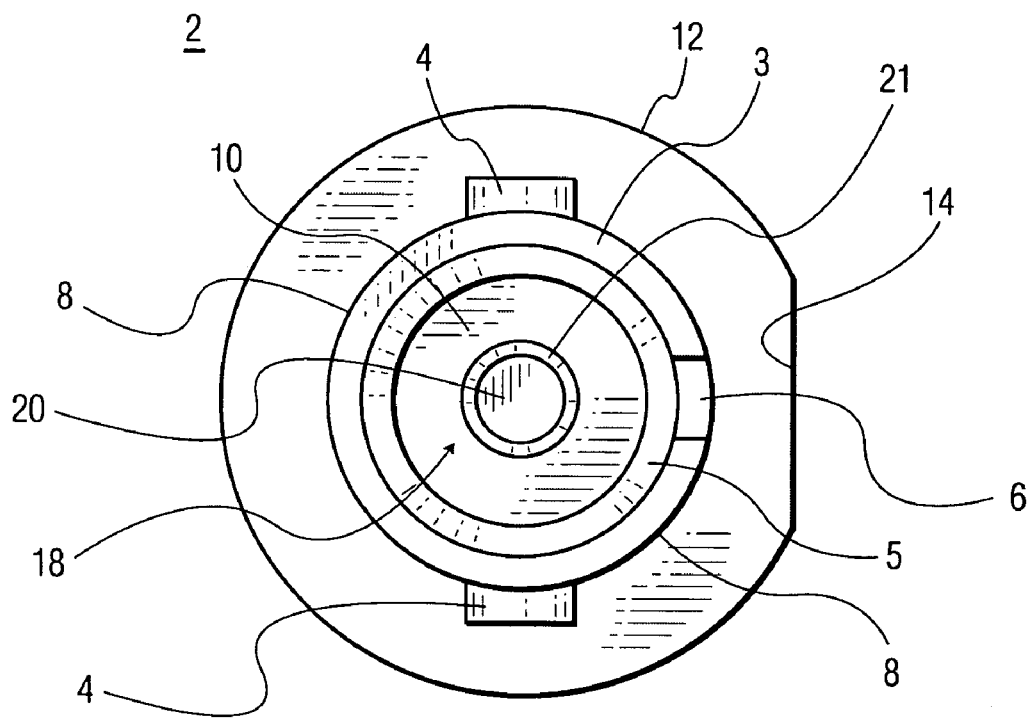
FIG. 2 is a front elevational view of the connector of FIG. 1.

A front elevational view of the present connector 2 is shown in FIG. 2. As previously explained, the hole 18 in the frontmost segment 8 receives a portion of the male ST connector, and the hole 20 of the reduced inside diameter segment 10 is sized to receive the center ferrule of the male ST connector (not shown). Note that the front edge of the hole 20 includes a beveled surface 21 proximate its interface with the backwall 10 of hole 18.

Figure 3:
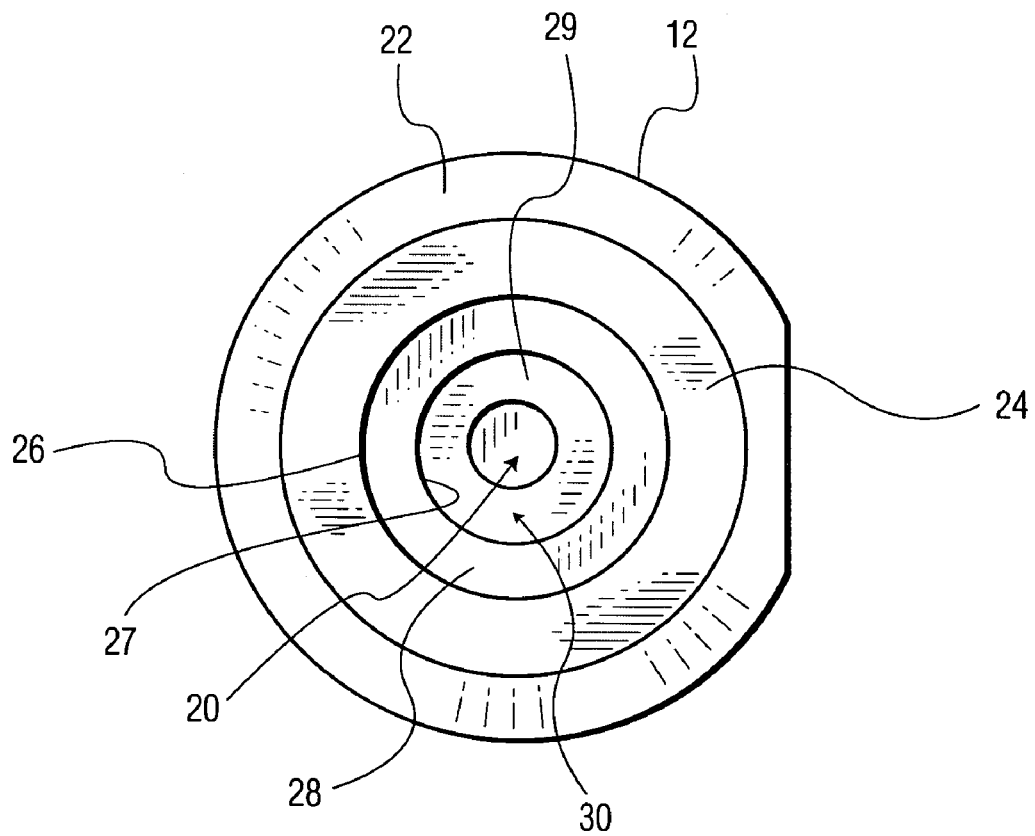
FIG. 3 is a back elevational view of the connector of FIG. 1.
Figure 4:
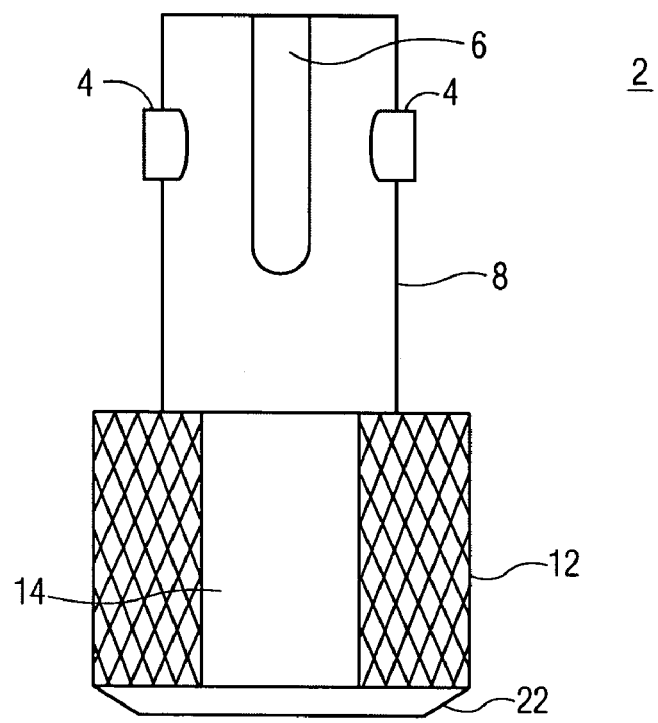
FIG. 4 is a bottom plan view of the connector of FIG. 1.
Figure 5:
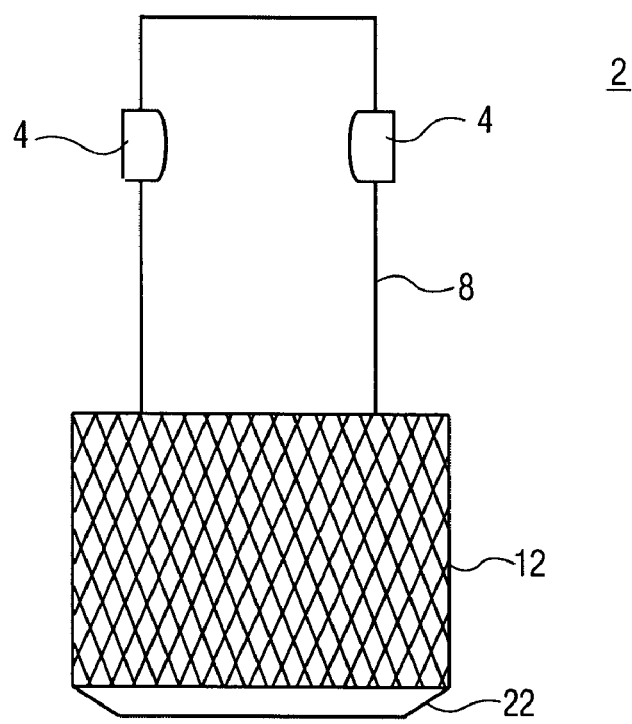
FIG. 5 is a top plan view of the connector of FIG. 1.

In FIG. 3, a back elevational view of the connector 2 is shown. A beveled edge 22 is provided on a back portion or edge of the cylindrical segment 12, as previously mentioned. Proceeding inward from the beveled edge 22, a flat band like circular face or portion 24 is shown, followed by a hole 26, followed by a flat ring-like portion 28 (back face of hole 26), followed by countersunk hole 30 having a cylindrical sidewall 27 defining the sides thereof, and a backwall 29, terminating to the center hole 20 which extends through to the reduced inside segment 10 in the frontmost portion or segment 8. As will be shown in greater detail below, the countersunk hole 30, and its backwall 28 are configured for receiving and press fitting therein an electro-optical device having a top-hat configuration, as will be described in greater detail below. Bottom and top plan views of the connector 2 are shown in FIGS. 4 and 5, respectively.

Figure 6A:
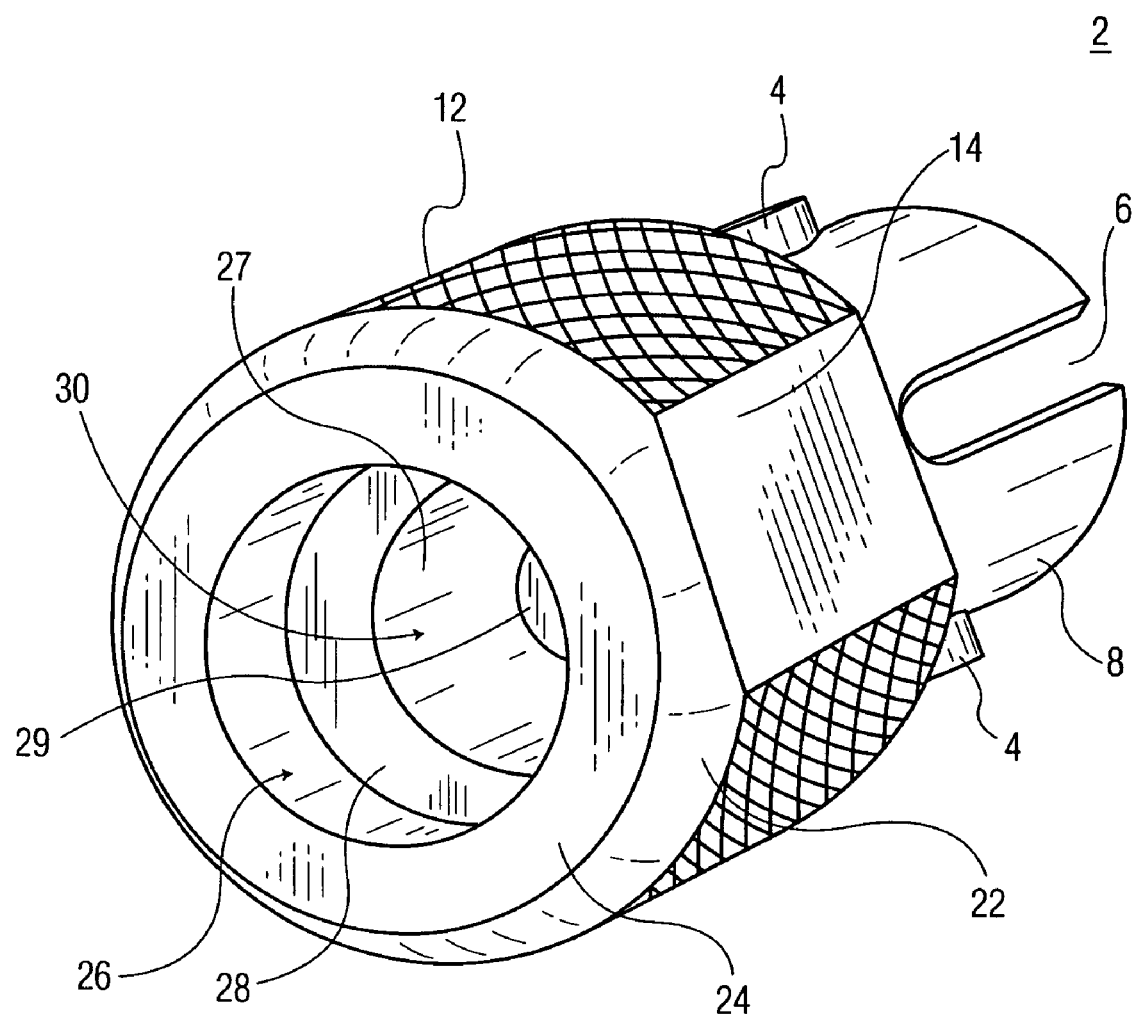
FIG. 6A is a pictorial view looking toward a back portion of the connector of FIG. 1, for a first embodiment of the invention.
Figure 6B:
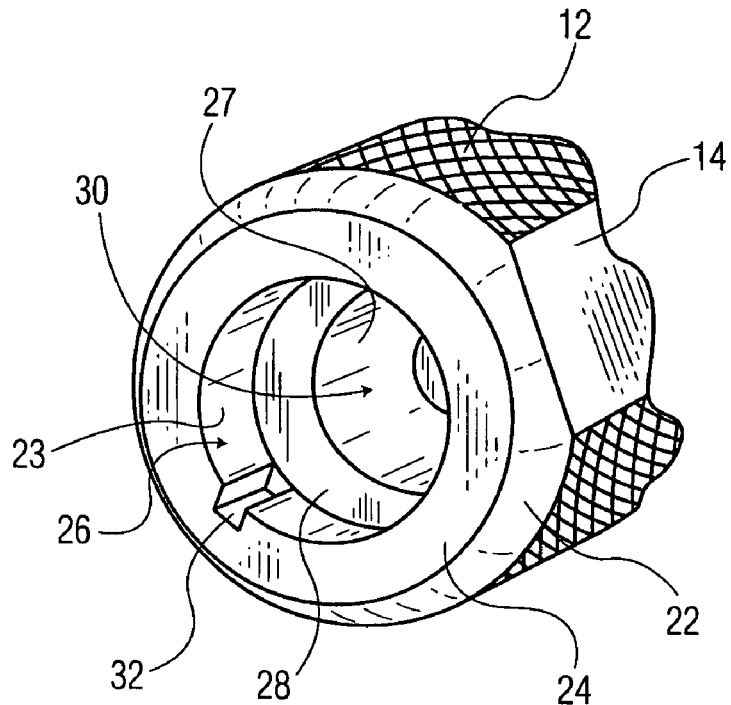
FIG. 6B is a pictorial view looking toward a back portion of the connector of FIG. 1, for a second embodiment of the invention.
Figure 7:
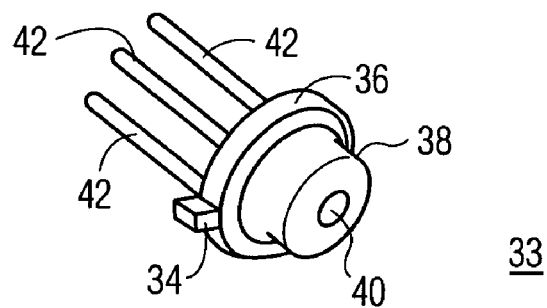
FIG. 7 shows a pictorial view looking toward the front of a known optical receiving or electrical transmitting device packaged in either one of the TO-18, TO-46, or TO-52 "top hat" packaging configuration.

A pictorial view looking toward the back of the connector 2 is shown in FIG. 6A, for one embodiment of the invention. In another embodiment of the invention, as shown in FIG. 6B, a slotway 32 is included in a portion of a sidewall 23 of the countersunk hole 26 for insuring proper alignment of an optical device to be press fitted therein to, such as TO-18, TO-46, and TO-52 top-hat shells as known in the art. A pictorial view looking toward the front of such a top-hat electrical optical device 33 is shown in FIG. 7. The shell includes a tab 34 protruding from a collar-like portion 36, and a frontmost cylindrical portion 38 extending from the top 36. A circular window 40 is included at the top of a stub-like cylindrical portion 38, for providing for the passage of a lightbeam either from the device in the case of a light transmitting device, or to the device in the case of a light receiving device, for example. Three electrical leads 42 are shown in this example protruding from the bottom of the device, which as previously explained, are typically electrically connected to a printed circuit board, or some other component within the housing of the electro-optical device to which the present connector 2 is press fit.

Figure 6C:
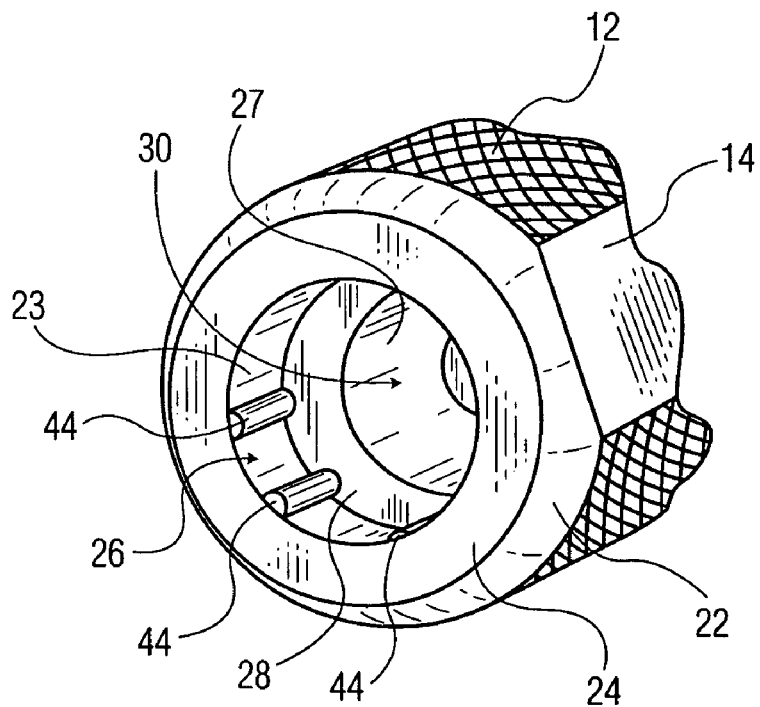
FIG. 6C is a pictorial view looking toward a back portion of the connector of FIG. 1, for a third embodiment of the invention.
Figure 8A:
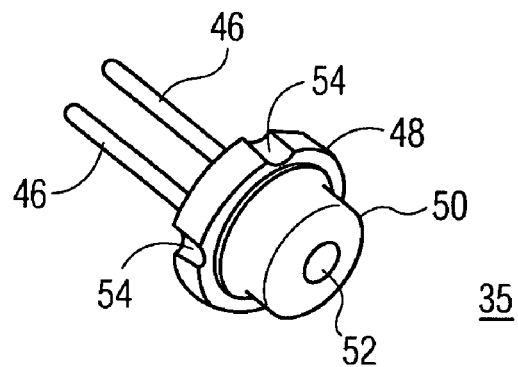
FIG. 8A shows a pictorial view looking toward the front or "top hat" end of TO-56 packaging configuration for a known optical transmitting or receiving device.
Figure 8B:
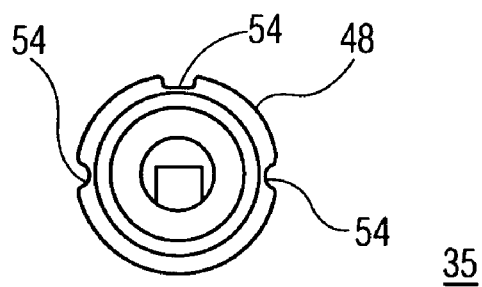
FIG. 8B shows a bottom view (absent the electrical leads) of the packaging configuration of FIG. 8A.

In another embodiment of the invention, as FIG. 6C, three elongated semicircular protrusions 44 are axially aligned and spaced apart on the sidewall 23 of the hole 26 for ensuring proper alignment of an electro-optical receiving or transmitting device that is housed within a TO-56 shell. A pictorial view looking toward the front of a optical device 35 housed in TO-56 shell is shown in FIG. 8A to include a pair of electrical leads 46, a collar-like portion 48, a cylindrical stud-like portion 50 extending from the collar 48, the latter having an optical window 52 in the top center portion thereof for permitting the passage of light. The collar 48 includes three semicircular grooves 54 spaced apart about its circumference, as shown in the back view of FIG. 8B. When the device 35 of FIGS. 8A and 8B, as housed in a TO-56 top-hat shell, in this example, is press fit into the connector 2, the grooves 54 align with the semicircular protrusions 44 (see FIG. 6C), for ensuring that the associated optical device 35 is properly aligned, thereby ensuring that electrical leads 46 can be connected within the housing without interference with one another. The optical device alignment mechanisms shown in the embodiments of the invention of FIGS. 6B and 6C are not meant to be limiting, and the back portion of the connector 2 can be configured for receiving optical electrical devices contained within other housing or shell configurations.

Figure 9:
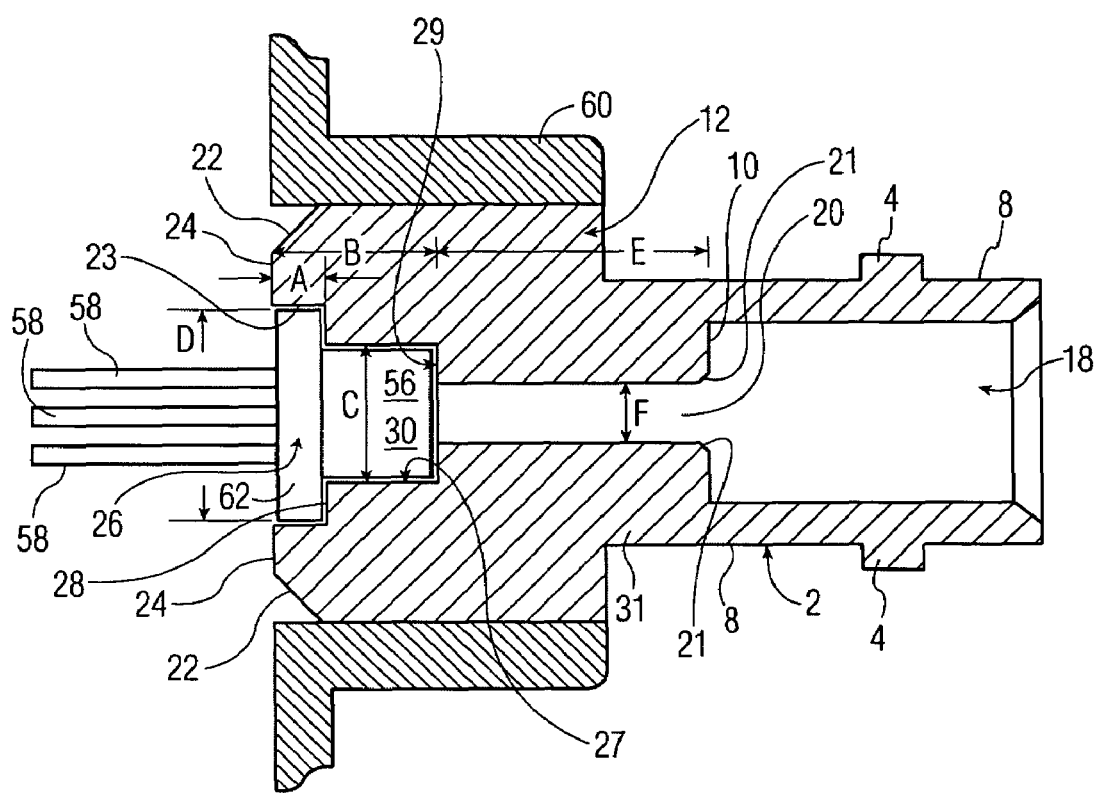
FIG. 9 shows a longitudinal cross-sectional view taken along 9-9 of FIG. 1, for one embodiment of the invention.

FIG. 9 is a partial cross-sectional view of the connector 2 of FIG. 1 taken along 9-9. In this example, an optical device 56 having electrical leads 58 protruding from the bottom thereof is shown installed within the connector 2, wherein the retention is via press fit in the preferred embodiment, as previously described. In other embodiments of the invention, the optical device 56 can be secured by other than press fitting, such as the use of appropriate epoxies, and other adhesive materials, for example. Note that in the example given, the connector 2 is press fit into a D-hole of the enclosure or housing 60 of the electro-optical apparatus.

With further reference to the cross section of connector 2 shown in FIG. 9, various important dimensional features are shown. Dimension "A" determines the depth of an electro-optical transmitting or receiving device 56 that is predetermined for the top-hat shell thereof. The dimension "B" is predetermined for controlling the depth of the electro-optical device 56 within connector 2. Dimension "C" is the inside diameter of the hole 30, which is predetermined for permitting press fitting of the collar or flange portion 62 of device 56 into hole 30. Dimension "D" represents the innermost and minimum diameter of the inward hole 26 of connector 2 for receiving the flange or collar portion 62 of electro-optical transmitting or receiving device 56. Dimension "E" represents the length of the hole 20 necessary for receiving the optical fiber ferrule sleeve of the male ST connector (not shown) to be mated with the connector 2 of the present invention. Dimension "F" is the inside diameter of hole 20 necessary for snugly but slidingly receiving the ferrule of the mating ST male connector. Note that dimensions "A," "B," and "E" determine the distance required such that the receiving or transmitting end of the optical fiber within the ferrule sleeve of the mating male connector, and the light receiving or transmitting electro-optical device 56 are in physical contact.

The above-described embodiments of the invention are not meant to be limiting. The dimensions "A" through "F," and the length and configuration of the frontmost cylindrical segment 8 of connector 2 can all be modified for accommodating different types of electro-optical transmitting and receiving devices 56, and for mating with many other male terminating connectors at the ends of fiber optic cables, other than ST male connectors. As will be described below, other known optical cable terminating connectors that can be mated with by changing the configuration of a connector 2 include MT/RJ, SC, SC/APC, E-2000, O-C, FC, FC/APC, LC, and LC/APC all of which are known in the art. Note that the acronym "APC" stands for Angle-polished Physical Contact.

Figure 10:
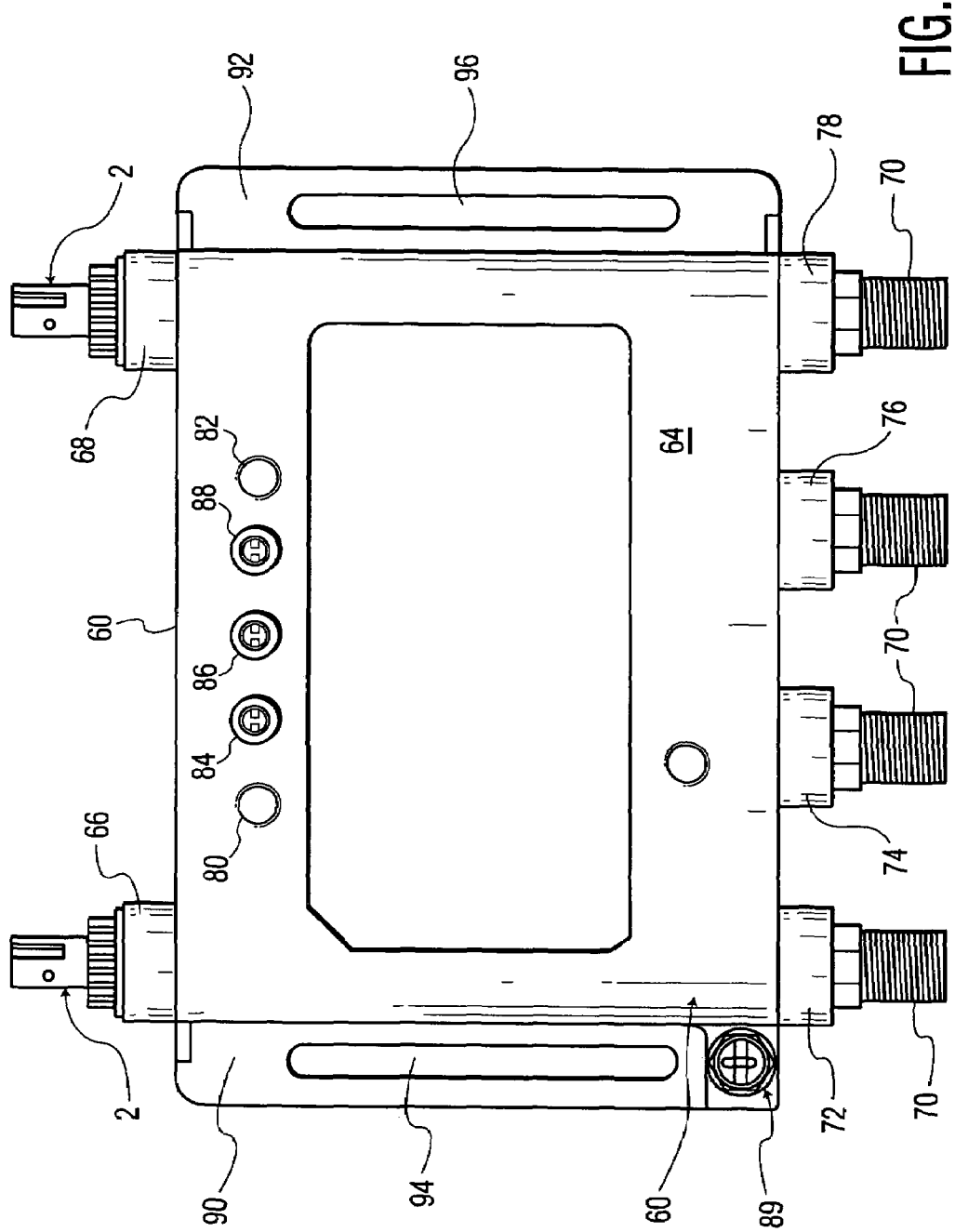
FIG. 10 shows a top view of a fiber node or optical to RF media conversion device incorporating at least two of the connectors of FIG. 1, for another embodiment of the invention.

The present connector 2, through the use of press fit into the housing of an electro-optical apparatus or device, is suitable for radio frequency interference (RFI) sealing of the housing, and moisture sealing, where the housing is used for an outdoor environment. The present inventors have developed an engineering prototype for a "fiber node" 64 (also known as an "optical to RF media conversion unit," or "a bi-directional RF/optical converter") that utilizes the present connectors 20 for facilitating the connection of fiber optic cables thereto. More specifically, the present inventors have designed a fiber node 64 to have many unique features, including the use of the subject inventive connectors 2 for eliminating the requirement of passing a fiber optic cable with its connector through a hole in the housing of the device 64 to mate with a female connector mounted upon a PC board, or otherwise within the employer of the housing 60 of the fiber node 64 apparatus. As shown in FIG. 10, a top view of the fiber node 64 includes at one end a leftmost one of the present connectors 2 for providing a "REV Fiber Out" port 66 fiber interface with a laser transmitting device representing electro-optical device 56 of FIG. 9, for transmission of the optically modulated reverse CATV spectrum along a fiber optic cable connected to the associated connector 2, as previously described. The rightmost connector 2 represents a fiber optic port "FWD Fiber In" port 68 for providing a fiber optic interface for the reception of the optically modulated forward CATV spectrum from a fiber optic cable terminated to the port 68 for coupling optical signals to a light receiving device representing electro-optical device 56 of FIG. 9. Four F-type coaxial connectors are associated with ports 72, 74, 76, and 78, respectively. Port 72 provides a reverse spectrum test point (Rev TP). Port 74 provides a DC power termination, for in this example receiving 12 volts. Also in this example, the reverse spectrum frequency ranges from 5 to 42 MHZ. Port 76 provides a termination for a forward spectrum test point (Fwd TP) for a spectrum signal frequency range of 52-870 MHZ. Lastly, port 78 provides a "DC/RF" termination for both interfacing bi-directional RF signals to a user, and receiving DC power from a known adapter device that combines DC power and RF signals on a single coaxial cable. Also shown as provided on the top of the fiber node 64, are a light emitting diode (LED) 80 that is activated to emit light to indicate that the light transmitting optical device 56 is active at port 66, and another LED 82 activated to indicate that optical signals are being received at port 68 by an optical or light receiving device employed for the electro-optical device 56. Test points 84, 86, and 88 are included in this example between LEDS 80 and 82, as shown. One volt per milliwatt of optical power is provided at test point 84 for checking the power level of the signals being transmitted, which is proportional to the optical signal strength thereof. Test point 86 provides a common ground for the test points 84 and 88. Test point 88 provides for a measure of the DC bias level, which is proportional to the optical signal strength of the optical signals being received at port 68. Note also that the housing 60 includes left side and right side mounting flanges 90, and 92, respectively, each having open elevated slots 94, 96, respectively, for facilitating the positioning of the housing 60 on a flat mounting surface (not shown).

Figure 11:
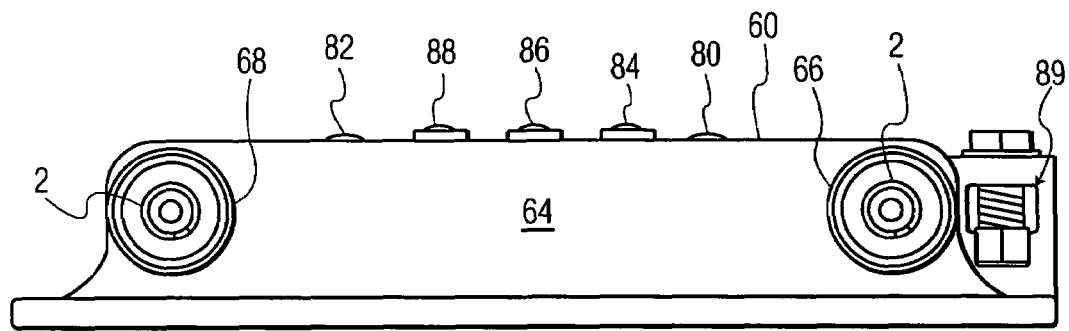
FIG. 11 shows a pictorial view looking toward the back of the device of FIG. 10, showing the mounting of the optical to RF interface connectors.
Figure 12:
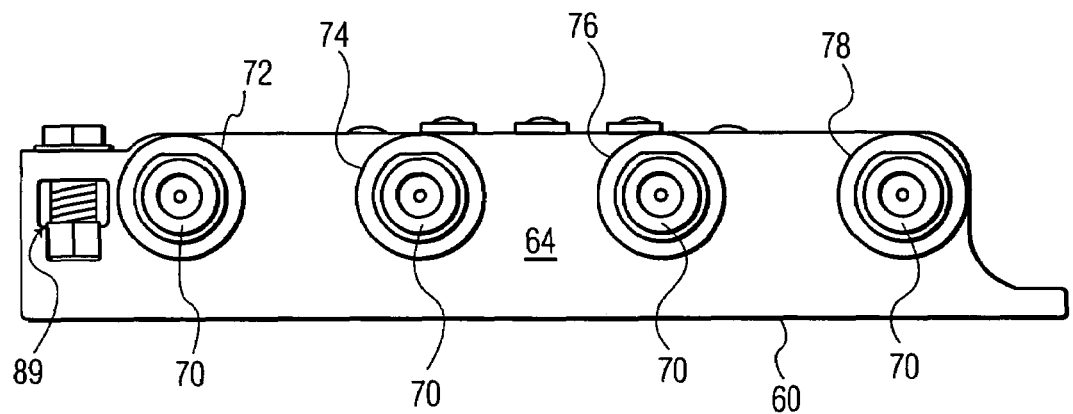
FIG. 12 shows a pictorial view looking toward the front of the device of FIG. 10.
Figure 13:
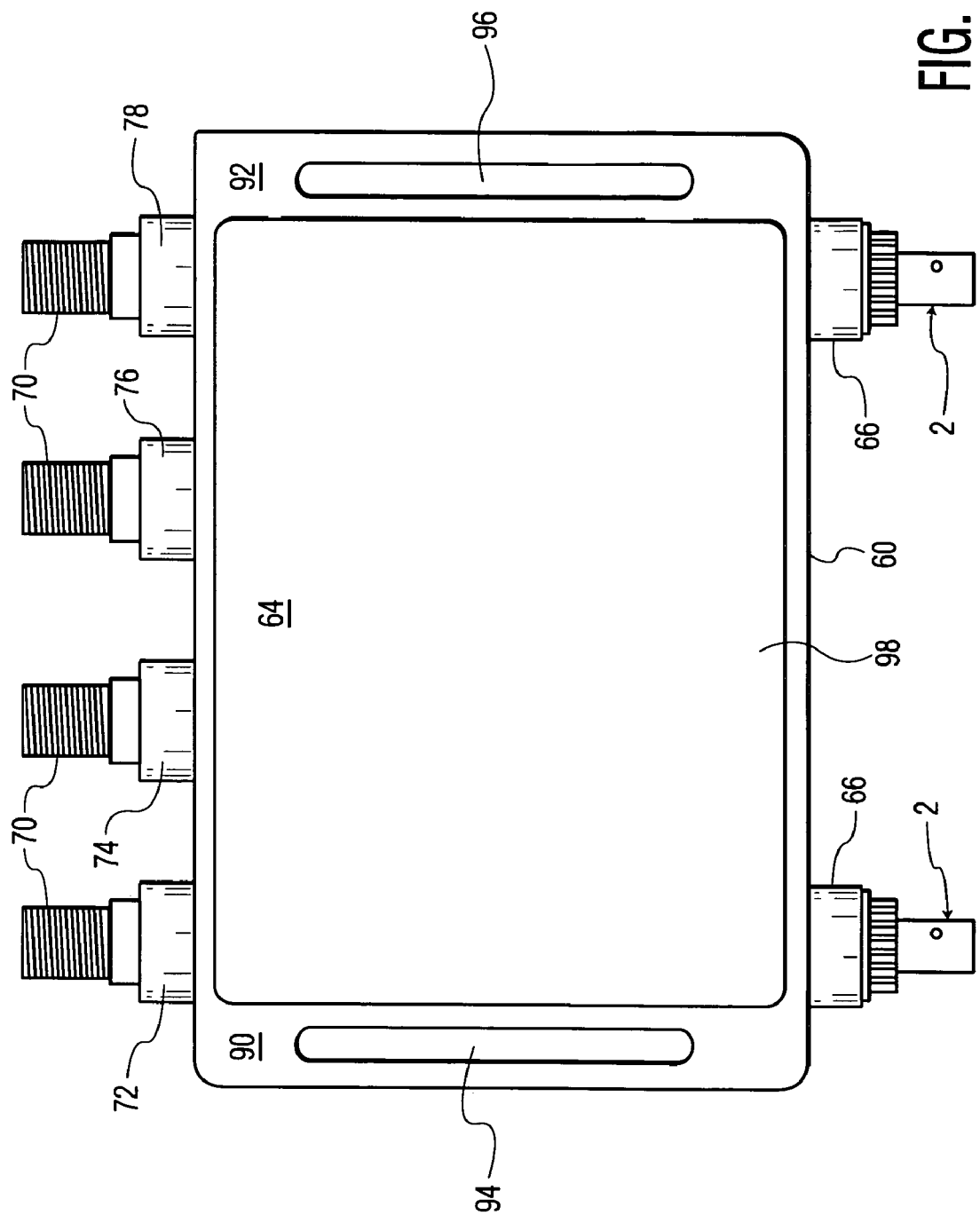
FIG. 13 shows a bottom plan view of the device of FIG. 10.

In FIG. 11, a back view of the fiber node 64 is shown. Note that the housing is formed from appropriate metal material, in this example. A ground termination device 89 is provided along a side portion of the housing proximate port 72, as shown in this example. A front view of the fiber node 64 is shown in FIG. 12. A bottom view thereof is shown in FIG. 13. A bottom cover plate 98 is secured to the bottom of fiber node 64 in a manner hermetically sealing the components contained within the housing from the elements, via a known sealing technique such as using appropriate gasket material and adhesives or solder.

Figure 14:
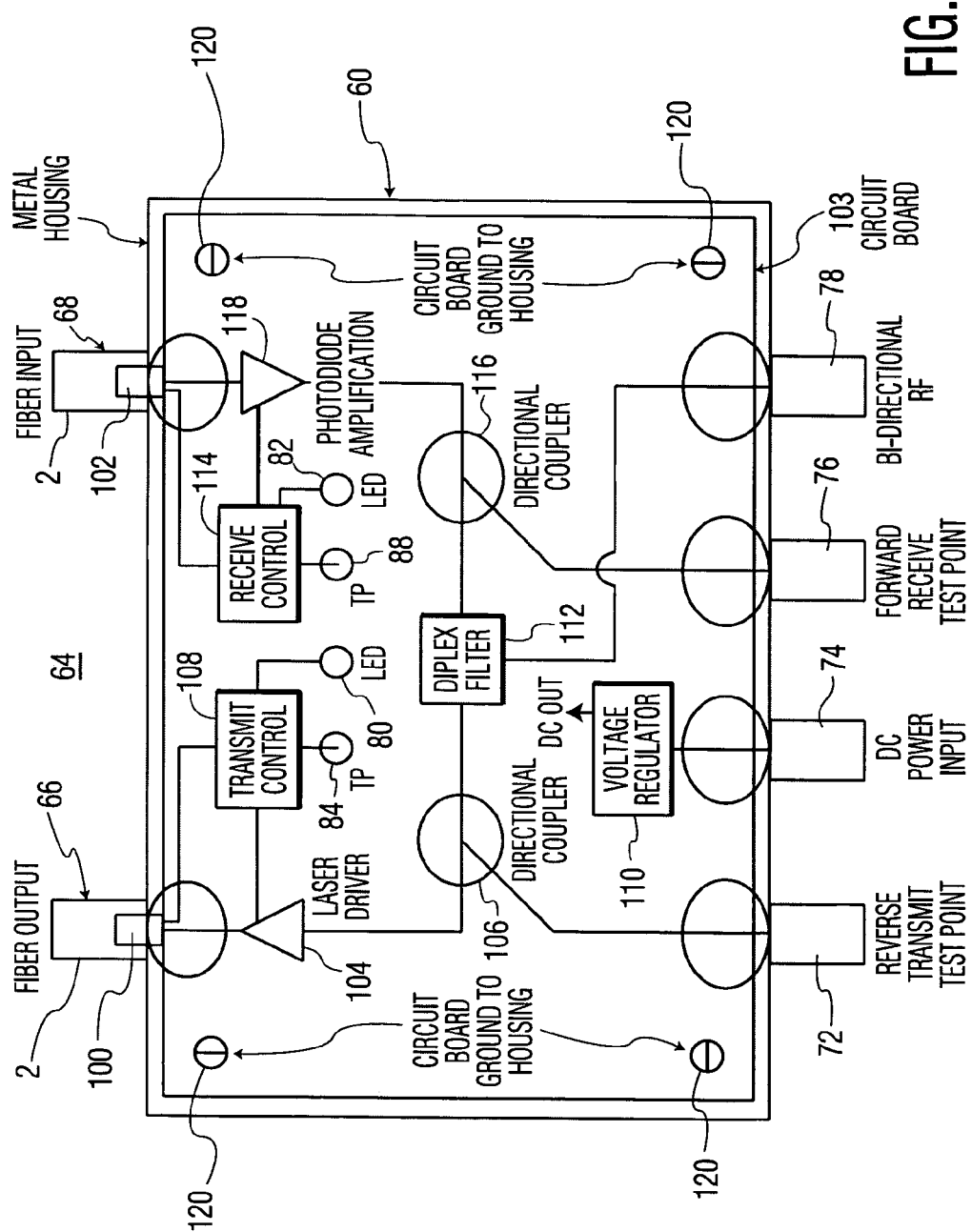
FIG. 14 shows a block schematic diagram of the electronic circuitry for the device of FIG. 10.

A block schematic diagram is shown in FIG. 14 for the fiber node 64 in this embodiment of the invention. The fiber node 64 provides a bi-directional RF and optical converter device or apparatus that includes a printed circuit board 103 mounted within the fiber node housing 60, in this example, via four grounding screws 120 located at each corner of the printed circuit board 103, as shown and at other locations where grounding of the circuit to the housing is necessary. A laser diode 100 is secured within a connector 2 at port 66, whereas a photodiode 102 is secured within the associated connector 2 at port 68. The photodiode 102 converts optical input signals into electrical signals which are connected to input terminals of a receive control circuit 114, and an amplifier 118. The receive control circuit 114 provides power to LED 82 for indicating that signals are being received, and also delivers a voltage proportional to the optical power to the test point 88. The output of amplifier 118 is connected to the input of a directional coupler 116. The directional coupler couples electrical input signals to the forward receive test point port 76, and also to a diplex filter 112. Electrical signals are also bi-directionally coupled between the diplex filter 112 and port 78, the latter providing bi-directional RF signal flow between a subscriber and the cable system provider. The diplex filter 112 also has an output connected to a directional coupler 106 for delivering electrical RF output signals from directional coupler 106 to port 72 providing a reverse transmit test point, and also to the input of a laser driver 104. The laser driver 104 is connected to a transmit control circuit 108, and also to laser diode 100; in this example, for converting the reverse RF output signals to optical signals, for transmission to the cable provider. The transmit control 108 also provides an output to LED 80 for indicating times that reverse RF output signals are being transmitted. The transmit control 108 also delivers a voltage proportional to the transmitted optical power to test point 84.

Figure 15:
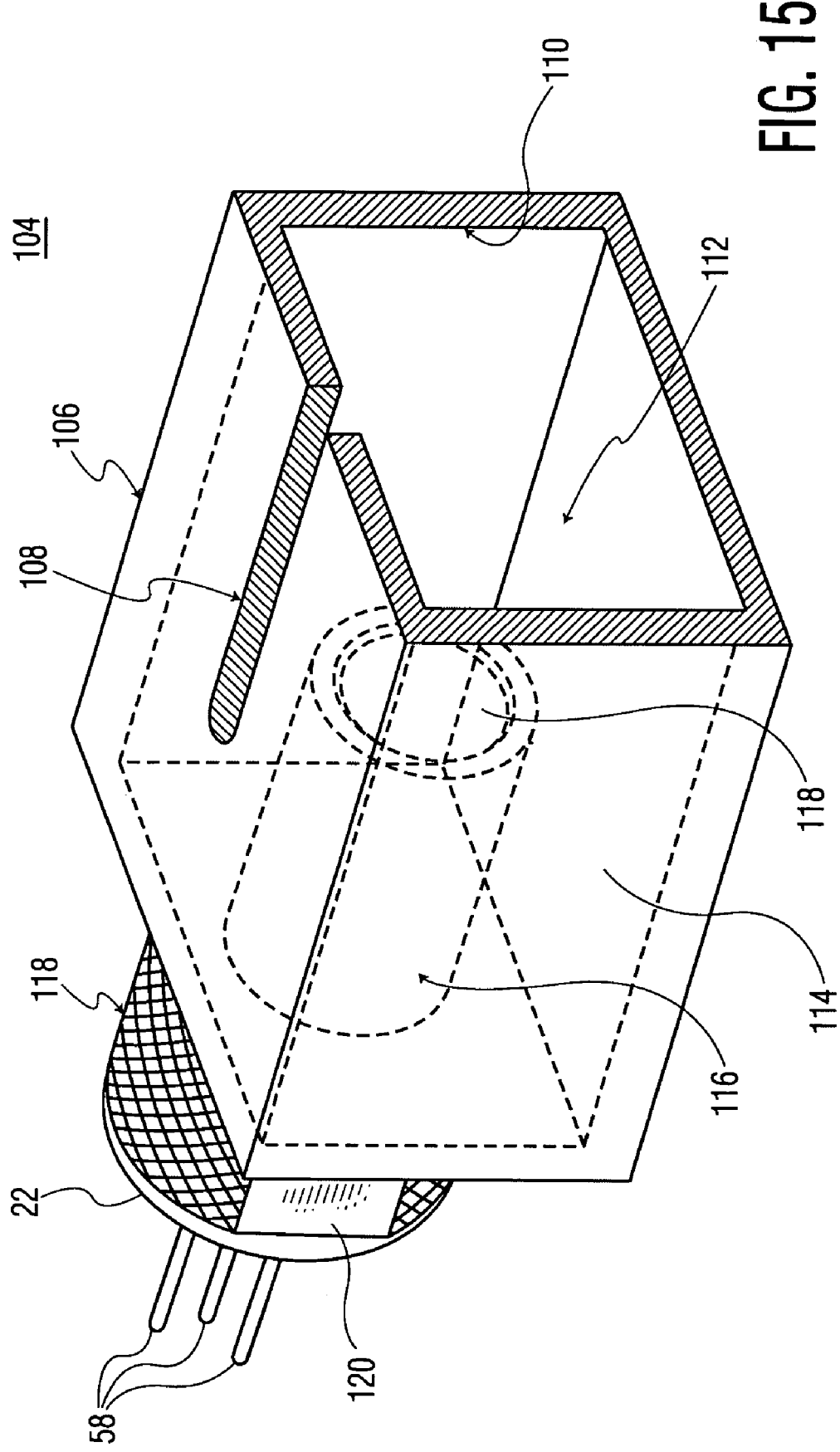
FIG. 15 shows a pictorial view looking toward a front portion of an optical to RF interface connector for a second embodiment of the invention.
Figure 16:
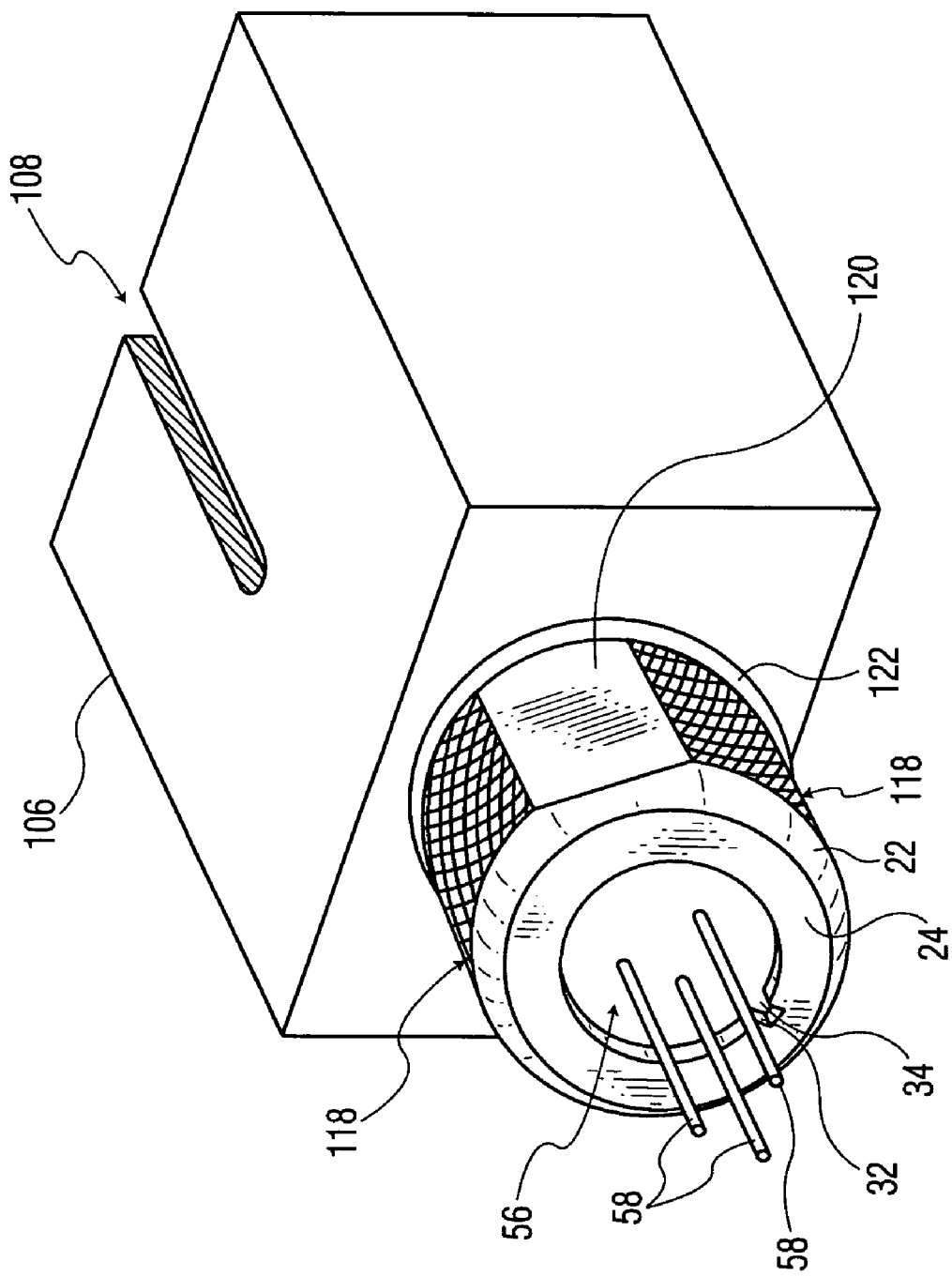
FIG. 16 is a pictorial view looking toward a back portion of the connector of FIG. 15.

With reference to FIGS. 15 and 16, a second embodiment of the invention is for providing in this example a rectangular configured optical to RF interface connector 104 for mating with SC, LC E2000, MTRJ, and MU male fiber optic cable termination connectors. The frontmost segment of the connector 104 for this second embodiment of the invention is a substantially rectangular shell or enclosure 106 including an interface keyway or slot 108 cut through the shell from the open front face 110 toward the rear portion of the shell 106, as shown. The shell 106 has a hollow cavity 112, and a back wall 114 that has a cylindrical optical fiber ferrule guide 116 protruding therefrom into the interior of the cavity 112, as shown. The through hole 118 of the optical ferrule guide 116, similar to the hole 20 shown in FIG. 9 for the connector of the first embodiment of the invention, passes through to the back cylindrical segment 118 to permit light to travel between the electro-optical device 56 mounted within the back cylindrical segment 118, in substantially the same manner as shown in FIG. 9 for the first embodiment of the invention. As in the previous embodiment, the flat portion 120 in the back cylindrical segment 118 serves as a press-fit orientation key. The remaining round outside portion of cylindrical segment of 118 is narrowed in the preferred embodiment of invention. An O-ring seal 122 is provided around the innermost portion of the back cylindrical segment 118, as shown. Otherwise, the back cylindrical segment 118 of this alternative embodiment is substantially similar to the back cylindrical segment 12 of the first embodiment of the invention, as shown in FIG. 9.

Figure 17:
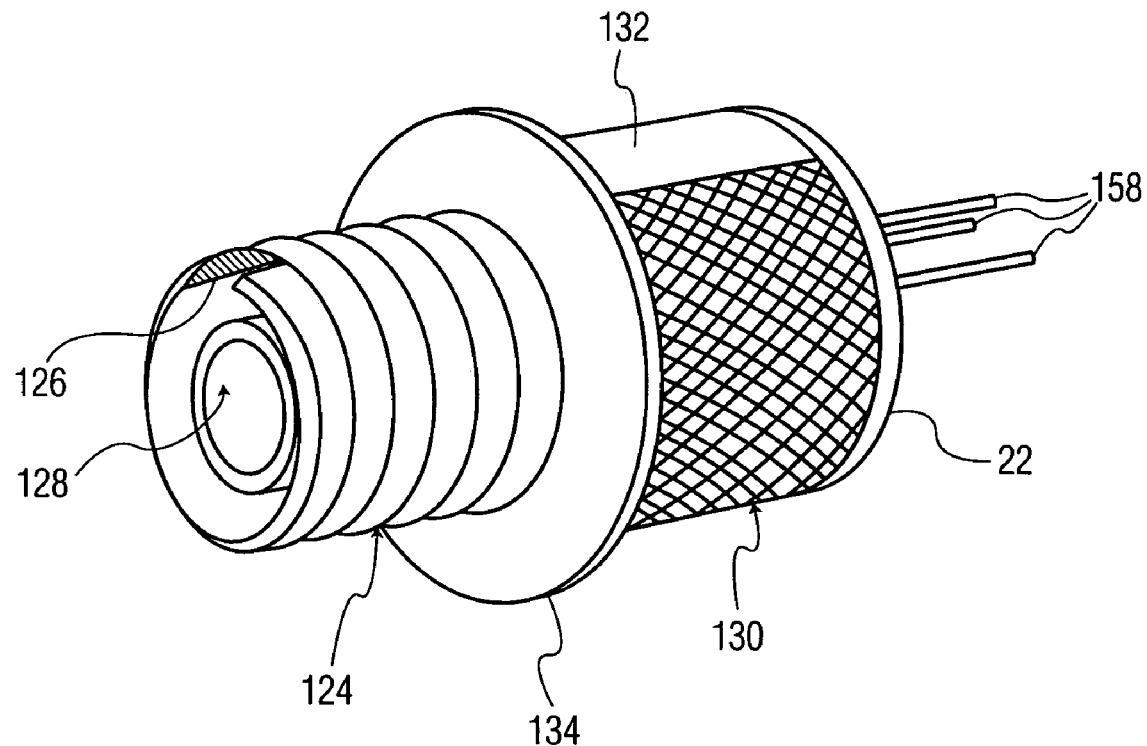
FIG. 17 is a pictorial view looking toward a front portion of an optical to RF interface connector for a third embodiment of the invention.
Figure 18:
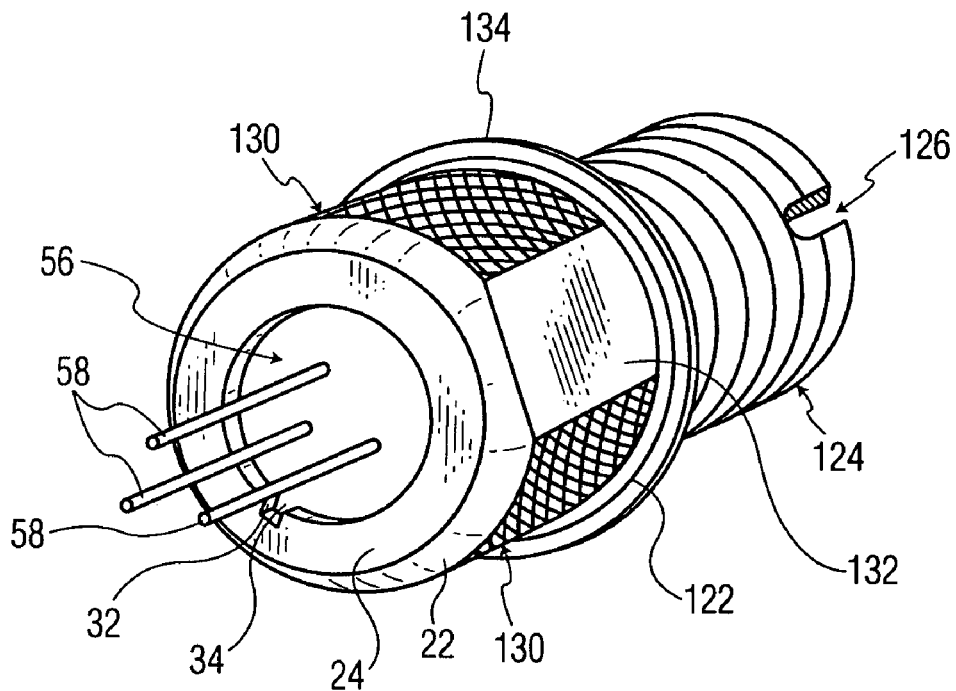
FIG. 18 is a pictorial view looking toward a back portion of the connector of FIG. 17 for the third embodiment of the invention.

A third embodiment of the invention is shown in FIGS. 17 and 18 for an optical to RF interface connector configured for mating with male FC, and SMA Optical fiber termination connectors. More particularly, the connector includes a threaded frontmost cylindrical segment 124 that is provided with a connector interface keyway 126 cut into its front edge, as shown. A cylindrical optical fiber ferrule guide 128 is centrally located within the cylindrical segment 124, as shown, and serves the same purpose as the ferrule guide of the second embodiment of the invention (see FIG. 15). A back cylindrical segment 130 is included as shown, with the rounded portion narrowed to provide better press-fit retention, and also configured with a flat portion 132 serving as a press-fit orientation key. The back cylindrical portion 130 has a greater outside diameter than the frontmost threaded cylindrical segment 124, in this example. A circular flange 134 is located between the frontmost threaded cylindrical segment 124 and the back cylindrical portion 130, as shown. The flange 134 has a greater outside diameter than the back cylindrical portion 130. The configuration of the back portion 130 is substantially the same as that of the back portion 118 of the second embodiment of the invention shown in FIG. 16, which each include inner ring seal 122.

Figure 19:
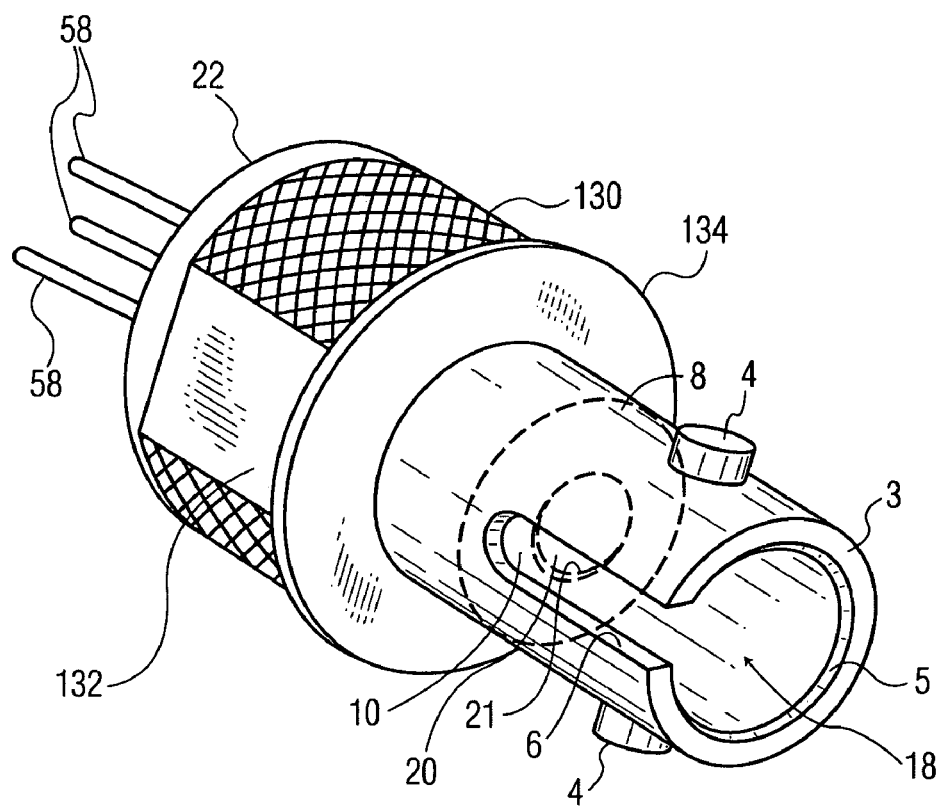
FIG. 19 is a pictorial view looking toward a front portion of a female optical to RF interface connector for mating with a male ST fiber optical cable termination connector for an alternative embodiment of the present invention.
Figure 20:
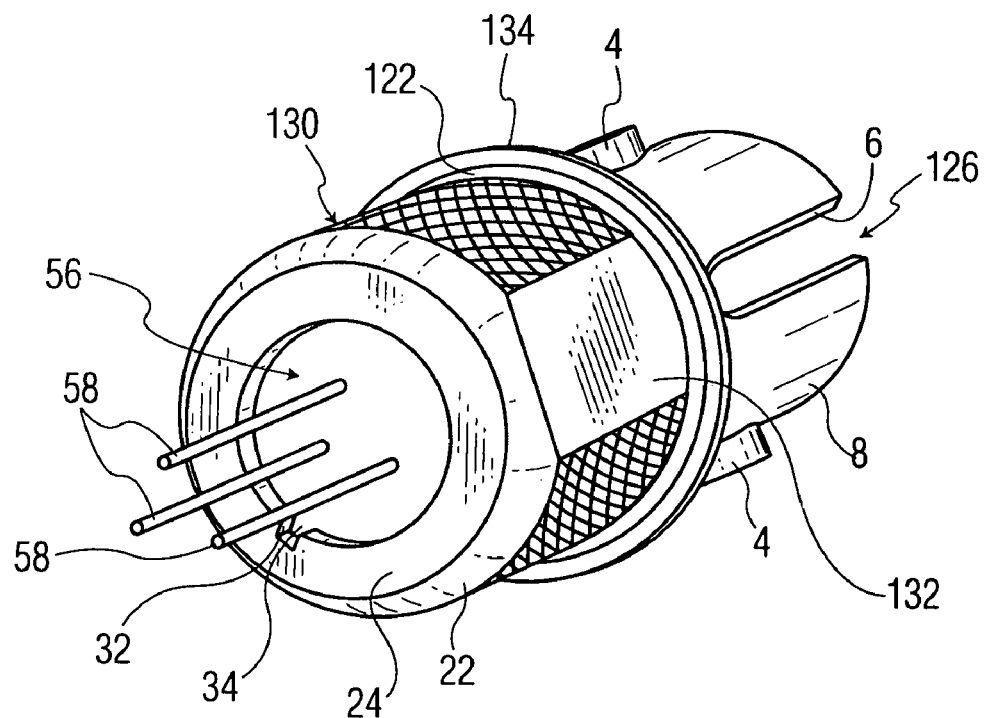
FIG. 20 is a pictorial view looking toward a rear portion of the connector of FIG. 19.

With reference to FIGS. 19 and 20, an alternative embodiment of the invention for providing a female optical to RF interface connector for mating with a male ST fiber optical cable termination connector includes a frontmost cylindrical portion 8 that is configured in substantially the same manner as shown in FIGS. 1 through 6A. The back cylindrical portion 130 is configured in substantially the same manner as that shown for the embodiments of FIGS. 17 and 18.

The various embodiments of the present invention provide a connector that relative to the prior art increases the interface reliability for the fiber optic cable connection, and reduces insertion loss by eliminating the necessity to loop a portion of fiber optic cable around the inside perimeter of the housing of a device, and by providing a direct electrical connection from the connector to the printed circuit board or other electrical components housed within the enclosure of the particular fiber optic device. Also, the alternative connector embodiments of the invention all permit the use of smaller enclosures or housings for the associated electro-optical devices, and further insure an RF seal to meet the requirements of Electromagnetic Interference suppression greater than 120 dB. Also particularly the press-fit connector embodiments insure a pressure tight seal between the connector and the housing of the associated device for preventing moisture migration into the interior of the housing. A yet further another advantage of the present invention in its various embodiments is that the alternative connector embodiments provide for optimum heat sinking of the active optical component mounted within the connector, whereby heat can pass from the optical component to the connector, and therefrom to the housing or enclosure of the associated device, thereby temperature stabilizing the optical component.

Although various embodiments of the invention have been shown and described, they are not meant to be limiting. Those of skill in the art may recognize certain modifications to these embodiments, which modifications are meant to be covered by the spirit of the appended claims. For example, the press fit configuration of connectors of the various embodiments of the invention can alternatively be screw-in type mounting by configuring the back portion to be externally threaded. Also, said connector embodiments can be made from any suitable metallic material such as nickel or tin plated brass, for example.

What is claimed is:

1. An optical to RF interface connector, comprising:
   a front portion configured for receiving and securely retaining a male connector at one end of a fiber optic cable;
   a back portion configured for mounting into a hole through a wall of a housing of an associated fiber optic/electrical device, wherein said back portion is configured for both press-fitting into the wall of said housing and providing alignment means for radially orienting the connector when press fit into a mounting hole of the housing of said fiber optic/electrical device;
   said back portion being further configured for receiving and retaining therein a light receiving or light transmitting electro-optical device;
   a light pathway being provided between said front and back portions to permit the passage of light between said electro-optical device and the end of said fiber optic cable; and
   wherein said back portion is further configured to include:
      indexing means located on an inside wall for radially orienting said electro-optical device upon installation therein.

2. The connector of claim 1, wherein said front and back portions are provided in a one piece shell of metallic material.

3. The connector of claim 1, wherein said front and back portions are provided in a one piece shell of nickel-plated brass material.

4. The connector of claim 1, wherein said front portion is configured for mating with an ST type fiber optic connector.

5. The connector of claim 4, wherein said front portion further includes a centrally located optical ferrule guide forming a portion of said light pathway.

6. The connector of claim 1, wherein said front portion is configured for mating with either one of an SC, LC, E2000, MTRJ, and MU type fiber optic connector.

7. The connector of claim 1, wherein said front portion is configured for mating with either one of an FC and SMA type fiber-optic connector.

8. The connector of claim 7, wherein said front portion includes an outside threaded outer cylindrical wall having an open front face, with a longitudinal optical interface keyway cut into the front face.

9. The connector of claim 1, wherein said front portion is configured for mating with a fiber optic connector selected from the group consisting of ST, SC, LC, E2000, MTRJ, MU, FC, and SMA types.

10. The connector of claim 1, wherein the alignment means comprises said back portion being further configured to include:
    a cylindrical outer wall with a flat portion for radially orienting said connector when press fit into the mounting hole which is in the form of a corresponding D-hole.

11. The connector of claim 10, wherein said back portion is further configured to include:
    indexing means located on an inside wall for radially orienting said electro-optical device upon installation therein.

12. The connector of claim 1, further including means for providing an O-ring seal between said back portion and said housing.

13. The connector of claim 1, wherein said back portion is further configured to receive an electro-optical device having a TO-18 top-hat shell.

14. The connector of claim 1, wherein said back portion is further configured to receive an electro-optical device having a TO-46 top-hat shell.

15. The connector of claim 1, wherein said back portion is further configured to receive an electro-optical device having a TO-52 top-hat shell.

16. The connector of claim 1, wherein said back portion is further configured to receive an electro-optical device having a TO-56 top-hat shell.

17. The connector of claim 1, wherein said back portion is further configured to insure electrical leads from said electro-optical device protrude outward and away from a free end of said back portion, for facilitating mechanical and electrical connection to the electrical leads.

18. The connector of claim 1, wherein said front portion is further configured for providing a female bayonet mechanical retention with a male bayonet connector.

19. The connector of claim 1, wherein said front portion includes:
    a rectangular outer shell having an open front face, a back wall secured to said back portion, said rectangular outer shell defining a substantially rectangular cavity;
    an optical connector interface keyway cut into a central portion of the front face; and
    a cylindrical optical fiber ferrule guide secured to a central area of said back wall, said ferrule guide protruding into said substantially rectangular cavity, and forming a portion of said light pathway.

20. The connector of claim 1, wherein said back portion has a knurled outside wall surface.

21. The connector of claim 1, wherein said front portion further includes a centrally located optical ferrule guide forming a portion of said light pathway.

22. The connector of claim 1, wherein said front portion includes an outside threaded outer cylindrical wall having an open front face, with a longitudinal optical interface keyway cut into the front face.

23. An optical to RF interface connector, comprising:
    a front portion configured for receiving and securely retaining a male connector at one end of a fiber optic cable;
    a back portion configured for mounting into a hole through a wall of a housing of an associated fiber optic/electrical device;
    said back portion being further configured for receiving and retaining therein a light receiving or light transmitting electro-optical device;
    a light pathway being provided between said front and back portions to permit the passage of light between said electro-optical device and the end of said fiber optic cable;
    wherein said front portion includes:
       a rectangular outer shell having an open front face, a back wall secured to said back portion, said rectangular outer shell defining a substantially rectangular cavity;
       an optical connector interface keyway cut into a central portion of the front face; and
       a cylindrical optical fiber ferrule guide secured to a central area of said back wall, said ferrule guide protruding into said substantially rectangular cavity, and forming a portion of said light pathway.

24. The connector of claim 23, wherein said back portion is further configured to include alignment means for radially orienting the connector when press fit into a mounting hole of the housing of said fiber optic/electrical device.

25. The connector of claim 24, wherein the alignment means comprises said back portion being further configured to include:
   a cylindrical outer wall with a flat portion for radially orienting said connector when press fit into the mounting hole which is in the form of a corresponding D-hole.

26. The connector of claim 23, wherein said back portion is further configured to include:
   indexing means located on an inside wall for radially orienting said electro-optical device upon installation therein.

* * * * *